United States Patent

[11] 3,585,428

[72] Inventors Bernard J. Bennington
Monroeville;
William C. Brenner, Pittsburgh, both of, Pa.
[21] Appl. No. 22,475
[22] Filed Mar. 25, 1970
[45] Patented June 15, 1971
[73] Assignee Westinghouse Electric Corporation
Pittsburgh, Pa.

[54] TRANSPOSED CONDUCTOR FOR DYNAMOELECTRIC MACHINES
11 Claims, 11 Drawing Figs.

[52] U.S. Cl........................................................ 310/213, 310/201
[51] Int. Cl..................................................... H02k 3/14
[50] Field of Search........................................... 310/213, 201; 174/33, 34

[56] References Cited
UNITED STATES PATENTS
3,118,015 1/1964 Willyoung..................... 310/213 X FOREIGN PATENTS
960,980 6/1964 Great Britain................ 310/213

*Primary Examiner*—D. X. Sliney
*Attorneys*—A. T. Stratton and F. P. Lyle

ABSTRACT: A transposed stranded conductor for dynamoelectric machines in which the transposition is incomplete in the slot portion of the conductor so that unbalanced strand voltages occur which balance the strand voltages occurring in the end portions of the conductor to minimize eddy current losses and circulating currents and to minimize the tendency to nonuniformity of current distribution. This result is accomplished by providing untransposed sections in the conductor separated by transposed sections, each of the end portions of the conductor outside the slot having a transposed section separating two untransposed sections. The untransposed sections are paired, with the strands in each pair of untransposed sections inverted in position with respect to each other.

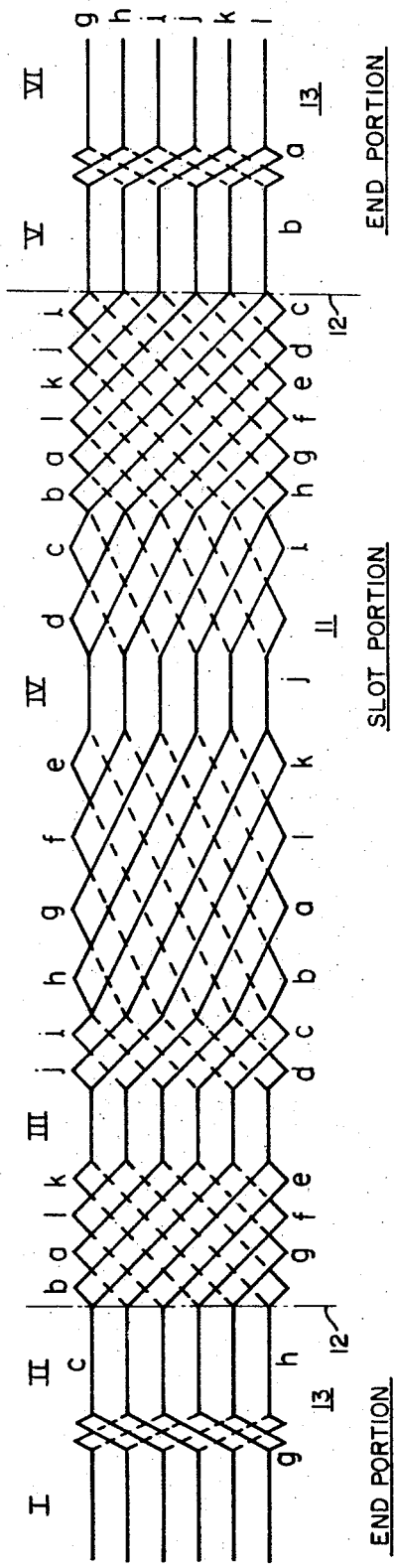

TRANSPOSED CONDUCTOR FOR DYNAMOELECTRIC MACHINES

BACKGROUND OF THE INVENTION

The present invention relates to a conductor for dynamoelectric machines, and more particularly to a transposed stranded conductor bar or half coil for machines of large size such as turbine generators.

The winding conductors of dynamoelectric machines are placed in slots in a laminated magnetic core. When currents flow in the conductors, magnetic fluxes occur across the slots which cause induced voltages and eddy currents in the conductor. Similar fluxes link the end turn portions of the conductor outside the slot, with some additional leakage flux from number of rotor, and cause similar induced voltages in the end portions. For this reason, the conductors of large machines are always of stranded construction, being built up of a substantial number of relatively thin strands to minimize the eddy current loss. The fluxes, however, are not uniform but vary radially in density so that the induced strand voltages vary from strand to strand, and circulating currents due to these unbalanced voltages flow between the strands causing excessive losses and heating. For this reason, it is necessary to transpose the strands in order to cancel out as far as possible the unbalanced strand voltages to minimize the circulating currents and resultant heating.

The most commonly used type of transposition which has been in general use for any years is the so-called Roebel transposition. In this arrangement, as shown in Roebel U.S. Pat. No. 1,144,252, the strands are disposed in two side-by-side stacks and are transposed within the slot by crossovers each cranks between the stacks. In each stack, the strands are inclined so that each strand moves vertically to the top or bottom of the stack, crosses over to the other stack, moves vertically through the other stack and crosses over back to the first stack. Thus, looking at the end of the conductor, each strand moves through an angle of 360° in going from one end of the slot to the other and emerges at the other end in the same relative position at which it entered the slot. Since the spacing between crossovers, or the cranking distance, is uniform throughout the length of the slot, each strand occupies all positions in the slot for equal distances and the induced strand voltages exactly balance out so that the transposition is completely balanced within the slot. The transposition within the slot, however, does not affect the induced voltages in the end portions of the conductor outside the slot which would cause circulating currents and excessive heating. In the usual practice, this has been overcome by dividing the strands into groups in the end portions and transposing the groups at the connections between adjacent conductors which form a complete coil. In this way, the strand voltages in the end portions can be balanced out in a complete coil or group of coils.

The Roebel transposition with group transpositions in the end portions is entirely satisfactory where the strands are insulated from each other throughout a complete coil or group of coils. In some cases, however, it is necessary or desirable to join the strands together at each end of each conductor bar or half coil. In very large turbine generators, for example, where a liquid coolant such as water is circulated through hollow strands in the conductor, it is impractical because of manufacturing difficulties to provide an individual water connection for each strand and a common water header or connector is used at each end of the half coil to supply water to all the strands of the conductor. This necessarily shorts the strands together at each end so that they are all electrically in parallel within the conductor and group transpositions are not possible. With the strands thus shorted together at each end the conventional Roebel transposition still results in balanced voltages within the slot, but the unbalanced strand voltages in the end portions of the conductor result in large circulating currents and excessive heating which is too great to be tolerated.

One scheme for cancelling the unbalanced voltages in the end portions has been proposed in Ringland U.S. Pat. No. 2,821,641. In this scheme the end portions of the conductor at opposite ends are inverted with respect to each other. This is done by transposing the strands within the slot through 180° in the first quarter of the slot length, through 180° in the second and third quarters of the slot length, and through another 180° in the last quarter of the slot, making a total transposition of 540° within the slot. The end portions are thus inverted with respect to each other, and with twice the crossover spacing in the center half of the slot length as compared to the spacing in the first and fourth quarters, the arrangement is such that each strand still occupies all positions in the slot for equal distances and a completely balanced transposition within the slot is obtained. The inversion of the end portions with respect to each other tends to approximately balance the strand voltages in the end portions and if they were the same at opposite ends, the strands could then be shorted together at both ends if desired. The fluxes in the end regions at opposite ends of the machine may not always be the same, however, and the desired degree of cancellation cannot always be obtained. A modification of this type of transposition has therefore been suggested in Willyoung U.S. Pat. No. 3,118,015 in which the strands are transposed within the slot through some angle between 360° and 540° so that the end portions are only partially inverted with respect to each other and any differences in the end region fluxes and in the induced strand voltages at opposite ends can be compensated for. The spacing of the crossovers in the slot portion is adjusted so that a balanced transposition is obtained within the slot and, with proper design, approximate cancellation of the strand voltages may be obtained.

There is, however, another problem which is not materially helped by these arrangements. Since the induced voltages in the end portions are only approximately balanced, some residual eddy currents or circulating currents will occur in the strands, and as the end portions of the conductor are not transposed these residual currents are not uniformly distributed. Thus, the top strands of the conductor carry much higher currents than the strands in the center of the conductor, which tend to have minimum current, while the strands at the bottom of the conductor carry currents of intermediate magnitude. Thus, even if the transportation is complete within the slot and the induced end portion voltages are approximately balanced so that circulating currents are effectively minimized, there is still a nonuniform current distribution between the strands and local overheating of the strands carrying the highest currents can occur.

SUMMARY OF THE INVENTION it is the principal object of the present invention to provide an improved transposed stranded conductor bar or half coil for dynamoelectric machines which effectively cancels out induced strand voltages, including the voltages induced in the end portions, to minimize eddy current losses and circulating currents in the conductor and which results in a more uniform current distribution between the strands than has previously been obtainable.

As discussed above, prior approaches to this problem have involved the provision of complete transpositions within the slot portion of the conductor to obtain a perfectly balanced transposition in the slot, and various expedients, including group transpositions and complete or partial inversion of the end portions, have been used or proposed to approximately cancel the unbalanced induced strand voltages in the end portions. In a copending application of W. C. Brenner, Ser. No. 22474, filed Mar. 25, 1970, and assigned to the assignee of the present invention, there is disclosed a transposed conductor for dynamoelectric machines based on a different approach in which the slot portion of the conductor is incompletely transposed so that unbalanced strand voltages occur in the slot portion, and these unbalanced voltages are made to effectively cancel the unbalanced strand voltages occurring in the end portions, so that the conductor as a whole is balanced and circulating currents are effectively minimized while a more uniform distribution of current between the strands is obtained than has heretofore been possible. This is done by nonuniform spacing of the crossovers between stacks to obtain the desired unbalance, and preferably by providing untransposed sections in the slot portion of the conductor at appropriate positions, with complete or partial inversion of the end portions. This is a highly effective and satisfactory transposition but the number and length of untransposed sections which may be desirable in the slot can be such that the necessary crossover spacing or cranking distance of the transposed sections becomes so small as to involve substantial manufacturing difficulties. This practical limitation on the arrangement of the above mentioned application may in some cases make it difficult to obtain the best possible arrangement.

In accordance with the present invention, this limitation is avoided and a more effective transposition obtained by placing transposed sections of the conductor in the end portions. More specifically, a plurality of pairs of untransposed sections is provided at appropriate positions in the conductor separated by transposed sections. Each end portion of the conductor has a transposed section separating two untransposed sections and an appropriate number of untransposed sections is provided in the slot portion. The untransposed sections are paired and the arrangement is such that the strand positions in each pair of untransposed sections are inverted with respect to each other. Each of the two untransposed sections of each end portion is paired with a corresponding untransposed section of the other end portion and the untransposed sections in the slot portion are similarly paired. In this way it is possible, without exceeding practical limitations, to provide the desired number of untransposed sections arranged in a manner which provides highly effective cancellation of unbalanced strand voltages and a much more uniform distribution of current between the strands than has previously been obtainable.

DESCRIPTION OF THE DRAWINGS

The invention will be more fully understood from the following detailed description, taken in connection with the accompanying drawings, in which:

FIG. 1 is a diagrammatic view in side elevation of a conductor bar or half coil embodying the invention;

FIGS. 2 through 7 are diagrammatic transverse sections showing the relative positions of the strands at various places along the length of the conductor of FIG. 1;

DESCRIPTION OF PREFERRED EMBODIMENTS

Figure 8:
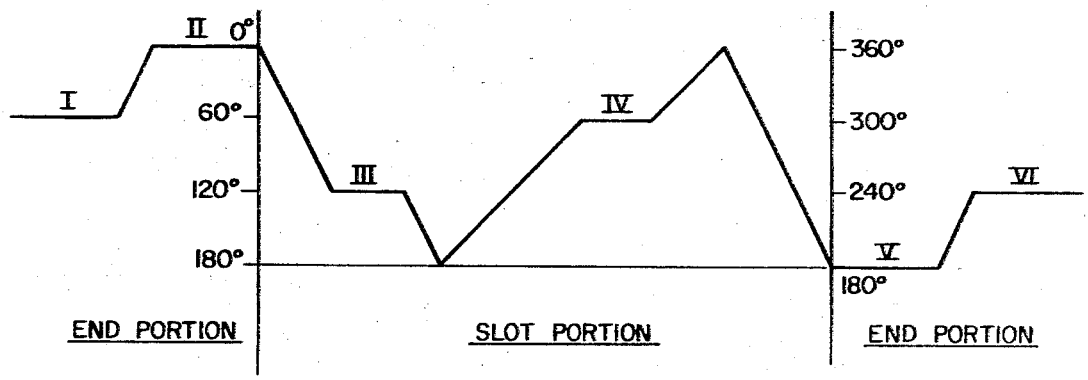
FIG. 8 is a diagram more clearly showing the manner in which each strand changes in position throughout the length of the conductor.

There is shown in FIG. 1 a somewhat diagrammatic representation of a conductor bar or half coil 10 for use in a dynamoelectric machine such as a large turbine generator. The conductor 10 has a straight central slot portion 11 adapted to be received in the slot of a stator core. The slot portion 11 extends between the lines 12 which may taken as representing the ends of a stator core. The conductor 10 also has end portions 13 at each end which are shown diagrammatically as extending straight out although they may of course have any suitable configuration and are usually formed in a complex curve to extend circumferentially around the machine for connection to the end portion of another half coil lying in another slot.

The conductor 10 is a stranded conductor made up of a plurality of strands designated by the letters $a$ through $l$ and represented diagrammatically by single lines in FIG. 1 for clarity of illustration. The strands are arranged in the usual manner in two side-by-side stacks. Six strands have been shown in each stack for the purpose of illustration although it will be understood that a much larger number of strands would normally be used in an actual conductor. The solid lines in FIG. 1 represent the strands, or portions of strands, which lie in the front or near stack of strands of the conductor 10. The dotted lines represent the portions of strands lying in the rear stack. It will be understood that the strands are lightly insulated from each other, and that the conductor 10 is encased in a suitable insulating sheath to provide ground insulation for the conductor in the usual manner. Some or all of the strands may be made hollow for circulation of a coolant fluid, or other cooling means may be provided such as coolant ducts disposed between the stacks in a known manner.

The strands of the conductor 10 are transposed in a manner which is somewhat similar to that of the usual Roebel transposition in that the transposition is made by crossovers between the stacks with the strands inclined to move upward or downward in the stack between crossovers. The manner in which the transposition is actually made, however, differs essentially from the conventional transpositions heretofore known. Starting at the left-hand end of FIG. 1, the strands are transposed in the end portion 13 through an angle of 60° approximately at the center of the end portion, thus dividing the end portion into two untransposed sections I and ii separated by a transposed section. FIGS. 2 and 3 show diagrammatically the positions of the individual strands in the sections I and II, respectively, and show the 60° transposition, that is, each strand in going from section I to section II moves through an angle of 60° in position in the conductor. It will also be noted from FIGS. 2 and 3 that this transposition is made in the counterclockwise direction looking from the left of FIG. 1.

In the slot portion 11 of the conductor the strands are transposed in the manner shown with two untransposed sections designated III and IV. FIGS. 4 and 5, respectively, show the strand positions at these points. It will be noted by comparing FIGS. 1, 2 and 3 that the direction or sense of transposition is reversed at the beginning of the slot portion. That is, in the end portion 13 the transposition between sections I and II is made in the counterclockwise direction. Starting at the beginning of the slot portion 11, however, the sense is reversed and the transposition in the slot portion is made in the clockwise direction, as will be clearly seen by inspection of the relative positions of the strands in the successive untransposed sections. The strands are transposed in the slot portion 11 through a total angle of 540° with one untransposed section III at the 120° point and the other untransposed section IV at the 300° point. The end portion 13 at the right-hand end of FIG. 1 consists of two untransposed sections V and VI separated by a 60° transposition of the strands approximately at the center of the end portion, as clearly shown n FIG. 1, the strand positions in these sections being shown in FIGS. 6 and 7. This last transposition is in the same sense as the transposition within the slot portion, that is, clockwise as viewed from the left of FIG. 1, so that the transposed sections in the two end portions 13 are in opposite senses.

The manner in which the strands are transposed will be further understood from the diagram of FIG. 8 which shows the angular position of an individual strand as it progresses from one end of the conductor to the other, the starting or 0° position of the strand being taken as its position in the stack at the beginning of the slot portion. Thus, each strand starting in the untransposed section I of the left-hand end portion is moved counterclockwise through 60° in the end portion to the untransposed section II. At the beginning of the slot portion, the strand is transposed in the opposite sense through 120° to the untransposed section III. From there it moves in the same sense through a total angle of 180° in the slot to the untransposed section IV which is thus at the 300° point. The strand is then transposed through a further angle of 240° in the same direction to the end of the slot, where it has then been transposed through a total angle of 540° within the slot interrupted by the two untransposed sections III and IV. At the end of the slot portion the strand emerges in the untransposed section V of the end portion and is then transposed through an additional angle of 60° to the final untransposed section VI, still in the same sense as the transposition within the slot, so that the transposed sections are in opposite senses in the two end portions. It will be understood that although the change in sense is shown in the drawing as being made at the left-hand end of the slot portion it could equally well be made at the right-hand end.

It will be seen that the strands are transposed in this way through a total angle of 540° within the slot portion 11, the crossover spacings or cranking distances being suitably increased in the central part of the slot portion as shown in FIG. 1, and that the strands are inverted in relative position at opposite ends of the slot portion, that is, in the untransposed sections II and V. It will also be seen that since the untransposed sections III and IV within the slot portion are 180° apart, the strands in these sections are inverted with respect to each other as can be seen in FIGS. 4 and 5. The 60° transpositions in the end portions in opposite senses also result in inversion of the strands relative to each other in the untransposed sections I and VI, as shown in FIGS. 2 and 7. Thus, considering the conductor 10 as a whole, there are six untransposed sections comprising three pairs of sections I and VI, II and V, and III and IV, the two sections of each pair being inverted in position with respect to each other.

Figure 9:
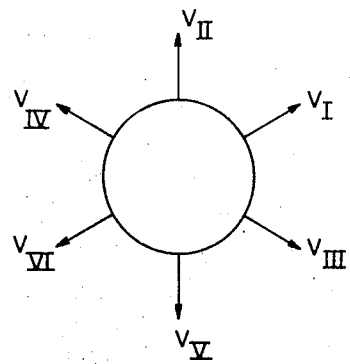
FIG. 9 is a diagram showing the relative positions of the unbalanced voltages in the conductor of FIG. 1.

The effect of this arrangement is shown in the diagram of FIG. 9 in which the circle represents the 360° available in the slot for transposition of the conductor strands and the arrows represent the relative positions and effective magnitudes of the untransposed sections of the conductor. The arrows are designated by the letter V with numeral subscripts corresponding to the designations of the untransposed sections in FIG. 8. It will be seen that the arrows corresponding to each pair of untransposed sections, as described above, are opposite in position and that the six arrows are equally spaced 60° apart. The effect of the mean flux passing through any untransposed section, that is, the effective induced voltage in that section, is cancelled by the effect of the equal mean flux passing through a similar untransposed section which is inverted with respect to the first section. The pairs of relatively inverted untransposed sections of equal length in the slot portion and in the end portions therefore tend to balance each other. Considering the conductor as a whole, however, some residual unbalanced voltage would exist if all untransposed sections were the same actual length. This is because the radial or depthwise variation of flux, or flux density, is greater in the slot portion than in the end portion. In order to make the effect of all untransposed sections the same, therefore, and eliminate any residual voltages, the length of the untransposed sections in the slot portion is made less than the length of the untransposed sections in the end portions. The lengths of these sections in the slot portion and in the end portions should be proportional to the slot portion and in the end portions should be proportional to the respective flux paths and the ratio of the lengths may, with sufficient accuracy, be taken as the ratio of the slot width to the spacing between coil centers n the end region of the machine. The necessary relation of the untransposed sections is thus readily determined for any particular machine. The unbalanced voltages can therefore readily be made of the same magnitude and since they are opposed in pairs and are equally spaced apart in position, as shown in FIG. 9, a substantially balanced conductor is obtained and the induced strand voltages in the conductor as a whole are substantially balanced, so that eddy current losses and circulating currents are effectively minimized. Since the untransposed sections in the slot portion are relatively short, there is adequate room in the slot for the necessary crossover spacings and no serious mechanical difficulties are encountered in the manufacture of the conductor.

This arrangement also has another important advantage. As mentioned previously, the conventional 540° transposition with untransposed end portions has a seriously nonuniform distribution of the residual eddy currents flowing in the conductor. This is because of the effect of the untransposed end portions which tend to cause an edge crowding effect with the strands at the top and bottom of the conductor carrying greater currents than those in the center. This results in a rather large difference between the currents in different strands with resultant local overheating of the strands which carry the highest currents. In the arrangement herein disclosed, with three pairs of untransposed sections, each pair being inverted and disposed in the manner shown, and with partial transposition in the end turns, the result is not only substantially complete balancing of the induced strand voltages but the residual eddy currents flowing in the strands are substantially completely averaged out or balanced so that the distribution of current between strands is essentially uniform and local overheating of particular strands is eliminated. This is an important advantage of the present invention which has not heretofore been obtainable with any of the known transpositions previously used or proposed.

Figure 10:
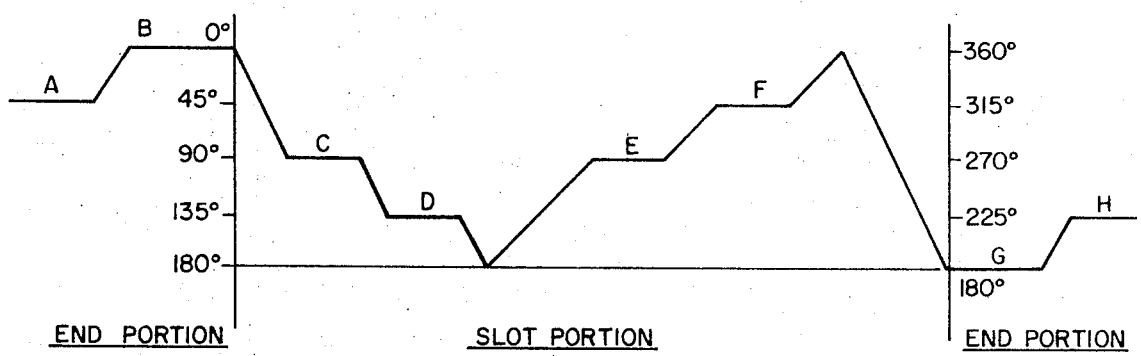
FIG. 10 is a diagram similar to FIG. 8 but showing another embodiment of the invention.

In the embodiment of the invention described above three pairs of untransposed sections are provided in the conductor. It will be apparent, however, that other numbers of untransposed sections might be used. Thus, for example, FIG. 10 illustrates the use of four pairs of untransposed sections. FIG. 10 is a diagram similar to FIG. 8 showing the angular position of each strand as it passes through the conductor from one end to the other. Starting at the left-hand end of this FIGURE, each strand is transposed in the end portion through an angle of 45° between the untransposed section and the untransposed section B. Within the slot portion the strand is again transposed through a total angle of 540° with a pair of untransposed sections C and E at 90° and 270°, respectively, and with a second pair of untransposed sections D and F at angles of 135° and 315°, respectively. In the end portion at the right-hand end of FIG. 10 the strand is further transposed through an angle of 45° between the untransposed sections G and H. As before, the transpositions in the end portions are made of opposite sense, the change in sense of transposition being made at either end of the slot portion. The untransposed sections A and H constitute a pair of sections and the sections B and G form another pair of untransposed sections in the end portions. In this embodiment of the invention, as in the previous one, the two untransposed sections of each of the four pairs are 180° apart in angular position and thus are inverted in position with respect to each other.

Figure 11:
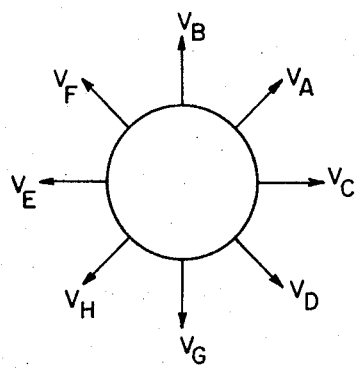
FIG. 11 is a diagram showing the relation of the unbalanced voltages in the conductor of FIG. 10.

FIG. 11 is a diagram similar to FIG. 9 but showing the positions of the voltages occurring in a conductor in accordance with FIG. 10. In FIG. 11 the arrows are again designated by the letter V with subscripts corresponding to the designations of the untransposed sections of FIG. 10. The lengths of the untransposed sections are made such that the induced voltages are substantially equal in the manner described above. That is, the lengths of the untransposed sections in the slot portion are related to the lengths of the untransposed sections of the end portions in the ratio of the respective flux paths. The vectors of FIG. 11 for each pair of untransposed sections therefore are equal and opposite, as shown, and the eight vectors are equally spaced 45° apart so that a substantially balanced conductor is obtained. This arrangement therefore is similar in effect to that of the previous embodiment but because of the greater number of untransposed sections a more effective balancing of the induced voltages can be obtained with an even more completely uniform distribution of the strand currents.

It should now be apparent that a transposed conductor has been provided which has many advantages. The use of a plurality of pairs of untransposed sections separated by transposed sections both in the slot portion and in the end portions of the conductor results in a more perfect balancing of the induced strand voltages with very effective minimizing of circulating currents and eddy current losses, and with substantial elimination of the problem of localized overheating of particular strands. The untransposed sections in the slot portion are relatively short so that no substantial difficulty in properly spacing the crossovers is encountered and there are no serious limitations on the design due to mechanical difficulties of manufacture. Thus a very desirable transposed conductor has been provided which makes it possible to reduce eddy current losses in the conductor to an absolute minimum and thus permit a substantial increase in the rating of dynamoelectric machines in which the conductor is used.

Certain specific embodiments of the invention have been shown and described for the purpose of illustration but it will be apparent that numerous other embodiments and modifications are possible within the scope of the invention.

We claim as our invention:

1. A conductor bar for a dynamoelectric machine having a straight central slot portion and two end portions, said conductor bar comprising a plurality of strands disposed in side-by-side stacks, said strands being transposed by crossovers from one stack to the other in sections of the bar separated by untransposed sections, each of said end portions of the bar having two untransposed sections with a transposed section between them such that the strands of each untransposed section are inverted in position with respect to the corresponding untransposed section of the other end portion.

2. A conductor bar as defined in claim 1 in which there is at least one pair of untransposed sections in the slot portion of the bar inverted in strand position with respect to each other.

3. A conductor as defined in claim 2 in which the strands are transposed through an angle of 540° in the slot portion of the bar.

4. A conductor bar as defined in claim 1 in which there are two untransposed sections in the slot portion of the bar and the strands are inverted in position with respect to each other in said untransposed sections and at the ends of the slot portions.

5. A conductor bar as defined in claim 1 in which the strands are transposed through an angle of 540° in the slot portion of the bar and through angles of 60° in the end portions of the bar, and there are two untransposed sections in the slot portion at positions corresponding to 120° and 300° respectively.

6. A conductor bar as defined in claim 1 in which the strands are transposed through an angle of 540° in the slot portion of the bar and through angles of 45° in the end portions of the bar, and there are four untransposed sections in the slot portion at positions corresponding to 90°, 135°, 270°, and 315° respectively.

7. A conductor bar for a dynamoelectric machine having a straight central portion and two end portions, said conductor bar comprising a plurality of strands disposed in side-by-side stacks, said strands being transposed by crossovers between stacks in spaced sections of the bar separated by untransposed sections, the bar having a plurality of pairs of untransposed sections, the strands in the two untransposed sections of each pair being inverted in position with respect to each other, and two of said untransposed sections separated by a transposed section being disposed in each end portion of the bar.

8. A conductor bar as defined in clam 7 in which each untransposed section in one end portion of the bar is paired with a corresponding untransposed section in the other end portion, and the transposed sections in the end portions are such that the strands in each of said paired untransposed sections are inverted in position with respect to each other.

9. A conductor bar as defined in claim 8 in which there is at least one pair of untransposed sections in the slot portion of the bar and the strands are transposed through an angle of 540° in the slot portion.

10. A conductor bar as defined in claim 8 in which there are two untransposed sections in the slot portion of the bar at positions corresponding to angles of 120° and 300°, respectively, and the strands in the transposed sections of the end portions are transposed through angles of 60° in opposite senses.

11. A conductor bar as defined in claim 8 in which there is a pair of untransposed sections in the slot portion of the bar at positions corresponding to angles of 90° and 270°, respectively, and a pair of untransposed sections at positions corresponding to angles of 135° and 315°, respectively, and the strands in the transposed sections of the end portions are transposed through angles of 45° in opposite senses.